(12) United States Patent
Pan (10) Patent No.: US 9,742,077 B2
(45) Date of Patent: Aug. 22, 2017

(54) MM-WAVE PHASED ARRAY ANTENNA WITH BEAM TILTING RADIATION PATTERN

(75) Inventor: Helen K. Pan, Saratoga, CA (US)

(73) Assignee: Intel Corporation, Santa Clara, CA (US)

(*) Notice: Subject to any disclaimer, the term of this patent is extended or adjusted under 35 U.S.C. 154(b) by 922 days.

(21) Appl. No.: 13/994,029

(22) PCT Filed: Oct. 1, 2011

(86) PCT No.: PCT/US2011/054483
§ 371 (c)(1),
(2), (4) Date: Nov. 15, 2013

(87) PCT Pub. No.: WO2012/125185
PCT Pub. Date: Sep. 20, 2012

(65) Prior Publication Data
US 2014/0145879 A1    May 29, 2014

Related U.S. Application Data

(60) Provisional application No. 61/452,754, filed on Mar. 15, 2011.

(51) Int. Cl.
*H01Q 3/00* (2006.01)
*H01Q 21/06* (2006.01)
(Continued)

(52) U.S. Cl.
CPC ......... *H01Q 21/067* (2013.01); *H01P 11/001* (2013.01); *H01Q 1/20* (2013.01);
(Continued)

(58) Field of Classification Search
CPC ...... H01Q 21/067; H01Q 1/20; H01Q 1/2266; H01Q 1/2291; H01Q 3/34; H01Q 3/36;
(Continued)

(56) References Cited

U.S. PATENT DOCUMENTS 4,637,073 A * 1/1987 Selin .................. G01S 7/034
330/134
5,107,273 A * 4/1992 Roberts ............... H01Q 3/2611
342/375
(Continued)

FOREIGN PATENT DOCUMENTS

JP    2001-264413 A    9/2001
JP    2007-251589 A    9/2007
(Continued)

OTHER PUBLICATIONS

International Search Report and Written Opinion received for PCT Application No. PCT/US2011/054483, mailed on Feb. 10, 2012, 9 Pages.
(Continued)

*Primary Examiner* — Frank J McGue
(74) *Attorney, Agent, or Firm* — Grossman, Tucker, Perreault & Pfleger, PLLC (57) ABSTRACT

A system according to one embodiment includes a phased array antenna comprising a plurality of antenna elements, the plurality of antenna elements configured in a planar array, wherein each of the plurality of antenna elements generates a beam pattern directed at an angle out of the plane of the planar array; and driver circuitry coupled to each of the plurality of antenna elements, wherein the driver circuitry comprises a plurality of transceivers, the plurality of transceivers configured to provide independently adjustable phase delay to each of the plurality of antenna elements.

15 Claims, 6 Drawing Sheets

(51) Int. Cl.
*H01Q 1/20* (2006.01)
*H01Q 1/22* (2006.01)
*H01Q 13/08* (2006.01)
*H01Q 13/16* (2006.01)
*H01P 11/00* (2006.01)
*H01Q 7/00* (2006.01)
*H01Q 3/34* (2006.01)
*H01Q 21/00* (2006.01)
*H01Q 25/00* (2006.01)
*H01Q 3/36* (2006.01)
*H01Q 21/24* (2006.01)
*H04B 7/0413* (2017.01)
*H04B 7/10* (2017.01)

(52) U.S. Cl.
CPC ......... *H01Q 1/2266* (2013.01); *H01Q 1/2291* (2013.01); *H01Q 3/34* (2013.01); *H01Q 3/36* (2013.01); *H01Q 7/00* (2013.01); *H01Q 13/085* (2013.01); *H01Q 13/16* (2013.01); *H01Q 21/0087* (2013.01); *H01Q 21/064* (2013.01); *H01Q 21/24* (2013.01); *H01Q 25/00* (2013.01); *H04B 7/0413* (2013.01); *H04B 7/10* (2013.01); *Y10T 29/49016* (2015.01); *Y10T 29/49018* (2015.01)

(58) Field of Classification Search
CPC ........ H01Q 7/11; H01Q 13/085; H01Q 13/16; H01Q 21/0087; H01Q 21/064; H01Q 21/24; H01Q 25/00; H01P 11/001; H04B 7/0413; H04B 7/10; Y10T 29/49016; Y01T 29/49018

USPC ....................................................... 342/371
See application file for complete search history.

(56) References Cited

U.S. PATENT DOCUMENTS

| | | | |
|---|---|---|---|
| 7,064,710 B1* | 6/2006 | Ksienski | H01Q 21/0006 342/372 |
| 2005/0248488 A1* | 11/2005 | Modro | H01Q 1/38 343/700 MS |
| 2012/0262328 A1* | 10/2012 | Shinonaga | H01Q 3/36 342/27 |
| 2012/0299765 A1* | 11/2012 | Huang | H01Q 3/24 342/81 |

FOREIGN PATENT DOCUMENTS

WO    2004/062035 A1    7/2004
WO    2009/144763 A1    12/2009

OTHER PUBLICATIONS

International Preliminary Report on Patentability with Written Opinion received for PCT Application No. PCT/US2011/054483, mailed on Sep. 26, 2013.

* cited by examiner

MM-WAVE PHASED ARRAY ANTENNA WITH BEAM TILTING RADIATION PATTERN

FIELD

The present disclosure relates to millimeter wave (mm-wave) phased array antennas, and more particularly, to mm-wave phased array antennas with beam tilting radiation patterns.

BACKGROUND

Electronic devices, such as laptops, notebooks, netbooks, personal digital assistants (PDAs) and mobile phones, for example, increasingly tend to include a variety of wireless communication capabilities. The wireless communication systems used by these devices are expanding into the higher frequency ranges of the communication spectrum, such as, for example, the millimeter wave region and, in particular, the unlicensed 5-7 GHz wide spectral band at 60 GHz. This expansion to higher frequencies is driven in part by the requirement for increased data rate communications used by applications such as high definition video, for example, that require multi-gigabit data rates. Propagation losses and attenuation tend to increase at these higher frequencies, however, and it can become difficult to implement antenna systems on the device platform in a manner that provides the desired spatial coverage, for example, omni-directional or nearly omni-directional coverage while maintaining high directional antenna gain.

Existing approaches to solve this problem generally rely on the deployment of increased numbers of active antenna modules on many sides of the device to increase spatial coverage. This approach, however, increases cost and power consumption and takes up additional space on the device platform.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems and methods for achieving increased spatial coverage of wireless communications by deploying mm-wave phased array antennas comprising antenna elements with a beam tilting radiation pattern, on a platform. The antenna elements may be rectangular slot loop antennas configured to generate a beam pattern that is tilted away from the ground plane of the antenna element. The direction of tilting may be approximately 45 degrees away from the ground plane of the antenna element. The tilting of the beam pattern of the individual antenna elements relative to the orientation of the phased array may extend the directionality of the radio frequency (RF) spatial coverage. The phased array antenna may perform beam scanning to further increase RF spatial coverage and directional gain. The system may be configured to operate in the millimeter wave (mm-wave) region of the RF spectrum and, in particular, the 60 GHz region associated with the use of wireless personal area network (WPAN) and wireless local area network (WLAN) communication systems. The phased array antenna may optionally be integrated with a radio frequency integrated circuit (RFIC) and a baseband integrated circuit (BBIC) on a circuit board.

The term Personal basic service set Control Point (PCP) as used herein, is defined as a station (STA) that operates as a control point of the mm-wave network.

The term access point (AP) as used herein, is defined as any entity that has STA functionality and provides access to the distribution services, via the wireless medium (WM) for associated STAs.

The term wireless network controller as used herein, is defined as a station that operates as a PCP and/or as an AP of the wireless network.

The term directional band (DBand) as used herein is defined as any frequency band wherein the Channel starting frequency is above 45 GHz.

The term DBand STA as used herein is defined as a STA whose radio transmitter is operating on a channel that is within the DBand.

The term personal basic service set (PBSS) as used herein is defined as a basic service set (BSS) which forms an ad hoc self-contained network, operates in the DBand, includes one PBSS control point (PCP), and in which access to a distribution system (DS) is not present but an intra-PBSS forwarding service is optionally present.

The term scheduled service period (SP) as used herein is scheduled by a quality of service (QoS) AP or a PCP. Scheduled SPs may start at fixed intervals of time, if desired.

The terms "traffic" and/or "traffic stream(s)" as used herein, are defined as a data flow and/or stream between wireless devices such as STAs. The term "session" as used herein is defined as state information kept or stored in a pair of stations that have an established a direct physical link (e.g., excludes forwarding); the state information may describe or define the session.

The term "wireless device" as used herein includes, for example, a device capable of wireless communication, a communication device capable of wireless communication, a communication station capable of wireless communication, a portable or non-portable device capable of wireless communication, or the like. In some embodiments, a wireless device may be or may include a peripheral device that is integrated with a computer, or a peripheral device that is attached to a computer. In some embodiments, the term "wireless device" may optionally include a wireless service.

It should be understood that the present invention may be used in a variety of applications. Although the present invention is not limited in this respect, the circuits and techniques disclosed herein may be used in many apparatuses such as stations of a radio system. Stations intended to be included within the scope of the present invention include, by way of example only, WLAN stations, wireless personal network (WPAN), and the like.

Types of WPAN stations intended to be within the scope of the present invention include, although are not limited to, stations capable of operating as a multi-band stations, stations capable of operating as PCP, stations capable of operating as an AP, stations capable of operating as DBand stations, mobile stations, access points, stations for receiving and transmitting spread spectrum signals such as, for example, Frequency Hopping Spread Spectrum (FHSS), Direct Sequence Spread Spectrum (DSSS), Complementary Code Keying (CCK), Orthogonal Frequency-Division Multiplexing (OFDM) and the like.

Some embodiments may be used in conjunction with various devices and systems, for example, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a display, a flat panel display, a Personal Media Player (PMP), a digital video camera (DVC), a digital audio player, a speaker, an audio receiver, an audio amplifier, a data source, a data sink, a Digital Still camera (DSC), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless AP, a wired or wireless router, a wired or wireless modem, a wired or wireless network, a wireless area network, a Wireless Video Are Network (WVAN), a Local Area Network (LAN), a WLAN, a PAN, a WPAN, devices and/or networks operating in accordance with existing WirelessHD™ and/or Wireless-Gigabit-Alliance (WGA) specifications and/or future versions and/or derivatives thereof, devices and/or networks operating in accordance with existing IEEE 802.11 (IEEE 802.11-2007: Wireless LAN Medium Access Control (MAC) and Physical Layer (PHY) Specifications) standards and amendments ("the IEEE 802.11 standards"), IEEE 802.16 standards, and/or future versions and/or derivatives thereof, units and/or devices which are part of the above networks, one way and/or two-way radio communication systems, cellular radio-telephone communication systems, Wireless-Display (WiDi) device, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

Some embodiments may be used in conjunction with suitable limited-range or short-range wireless communication networks, for example, "piconets", e.g., a wireless area network, a WVAN, a WPAN, and the like.

Figure 1:
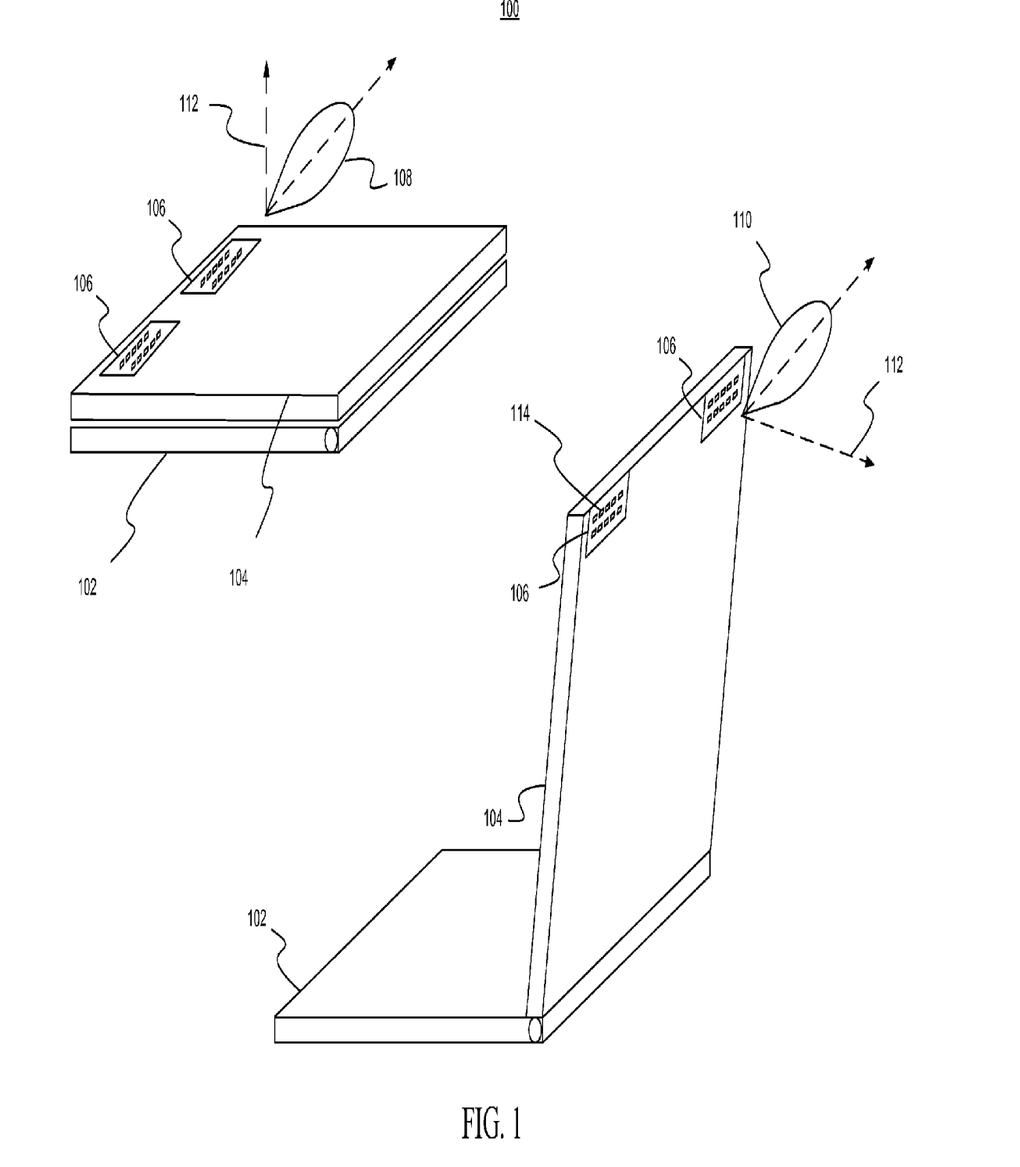
FIG. 1 illustrates a system diagram of one exemplary embodiment consistent with the present disclosure.

FIG. 1 illustrates a system diagram 100 of one exemplary embodiment consistent with the present disclosure. Platform 102 is shown as a laptop computer, in both a closed and open position, in this illustration, but it may be any device including a notebook, netbook, personal digital assistant (PDA), mobile phone, network hub or any device for which wireless communication capability may be desired. Phased array antennas 106 are shown to be located in the upper left and right corners of laptop lid 104, although they may be located at any suitable position on the platform 102 and there may be any number of such antennas. The number of phase array antennas 106 and their placement may be chosen, for example, based on RF requirements such as spatial coverage including scan directions, antenna gain and bandwidth, as well as other design and/or manufacturing considerations. In some embodiments, phased array antennas 106 may be disposed on interior surfaces or portions of platform 102.

Phased array antennas 106 comprise a number of antenna elements 114 which will be described in greater detail below.

Also shown in FIG. 1 are exemplary antenna beam patterns 108, 110 generated by phased array antennas 106. Beam pattern 110 is directed at an angle above the normal 112 to the lid 104 and may be useful when the lid 104 is in the open position. Beam pattern 108 is directed at an angle below the normal 112 to the lid 104 and may be useful when the lid is in the closed position. The beam patterns 108, 110 may be scanned through directed angles from the left side to the right side of the lid 104 to cover increased spatial areas around the platform 102. Although only one position of each beam 108, 110 is shown for illustrative purposes, in practice, the phased array antenna may generate a beam that is scanned or steered through many more positions by incrementally adjusting the relative phases of the antenna elements to repeatedly sweep the beam through an arc of desired coverage from the left side to the right side of the lid 104 as will be explained in greater detail below.

Figure 2:
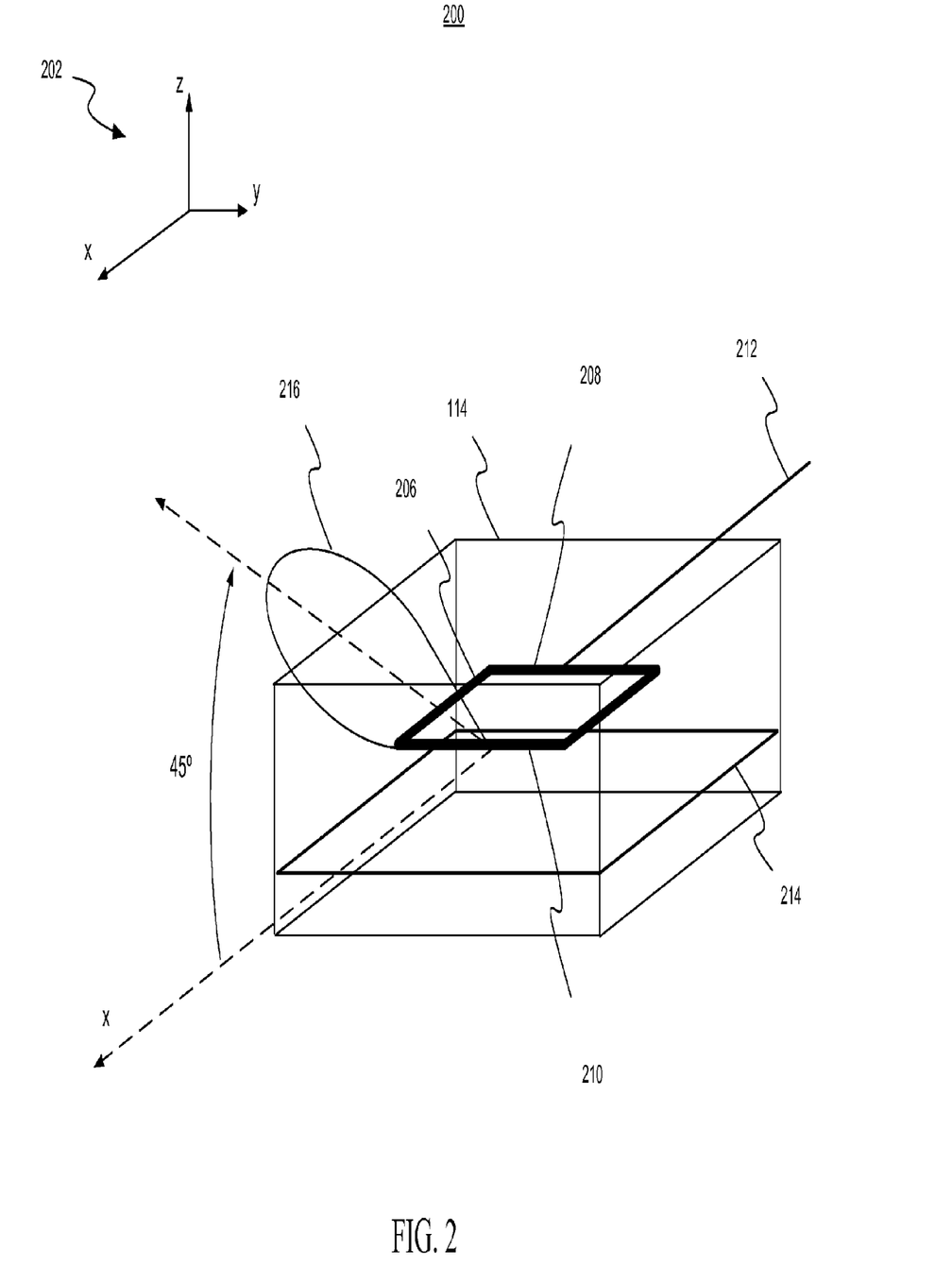
FIG. 2 illustrates a system diagram of another exemplary embodiment consistent with the present disclosure.

FIG. 2 is a system diagram 200 of another exemplary embodiment consistent with the present disclosure. FIG. 2 provides a more detailed view of an individual antenna element 114 from the phased array antenna 106. A legend 202 provides an orientation of the x-, y- and z-axis for this 3-dimensional view that will be helpful to clarify features of this drawing as well as those of the following FIG. 3.

Antenna element 114 may be a rectangular slot loop antenna comprising a loop element 206 having a front edge 210 and a rear edge 208, a signal feed line 212 and a ground plane 214. During transmission, the loop element 206 radiates an RF signal that is provided by signal feed line 212. During reception, the loop element 206 receives an RF signal that is delivered back through signal feed line 212. By configuring the loop element 206 and/or the signal feed line 212 to introduce an appropriate delay between the signal at the front edge 210 and the signal at the rear edge 208, a beam pattern 216 can be generated that tilts up or down out of the x-y plane by an amount that depends on the introduced delay. The illustration in FIG. 2 shows an example where the beam pattern 216 is tilted up from the x-axis by 45 degrees.

Figure 3:
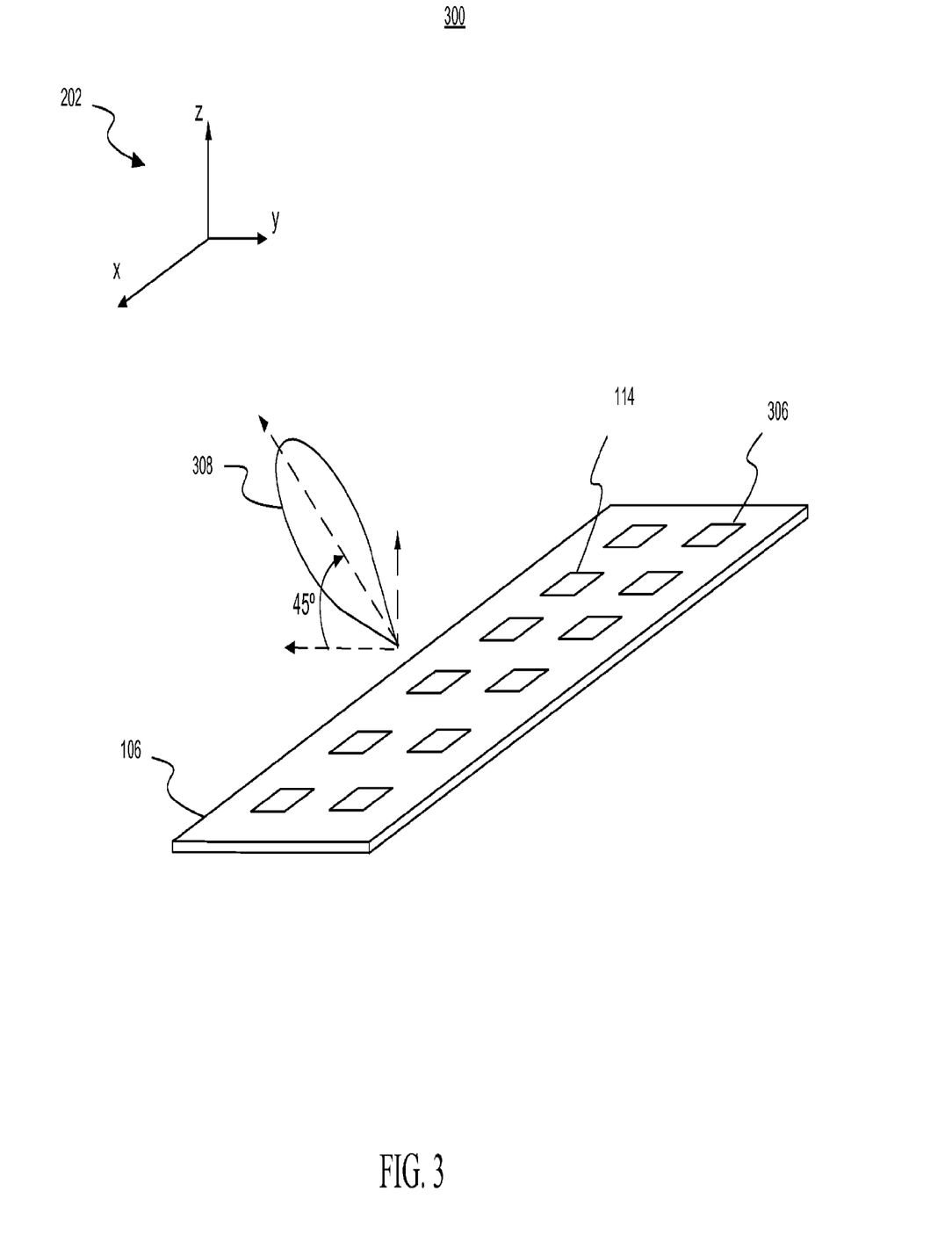
FIG. 3 illustrates a system diagram of another exemplary embodiment consistent with the present disclosure.

FIG. 3 is a system diagram 300 showing another exemplary embodiment consistent with the present disclosure. FIG. 3 illustrates the phased array antenna 106 comprising antenna elements 114 in the same x-, y-, z-axis orientation as shown in FIG. 2. A beam pointed in the z-axis is typically referred to as a broadside directed beam. A beam pointed in the x-y plane is typically referred to as an end-fire directed beam. Due to the beam tilting configuration of the individual antenna elements 114, as described above, phased array antenna 106 may be able to generate a scanned beam pattern 308 that is directed along an angle between broadside and end-fire. Beam pattern 308 is shown as being directed at an angle that is 45 degrees above of the x-y plane. The use of the beam tilting configuration of the individual antenna elements 114 enables the RF spatial coverage to be extended in a direction that may be more useful in mm-wave wireless communication applications.

Antenna elements 114 are shown to be configured in a 2×6 pattern on phased array antenna 106 for illustration purposes, but in practice the number and placement of antenna elements in a given phased array may be chosen based on desired properties of the scanned beam pattern to be generated. For example, increasing the number of antenna elements may generally increase the gain of the antenna beam. In some embodiments, a 16 element array may achieve a gain of approximately 15 decibels (dB), which may be sufficient for multi-gigabit data transfers within a WPAN or WLAN indoor environment.

In some embodiments, the antenna elements 114 that are configured in a phased array 106 may comprise dummy antenna elements 306 at some or all of the edges of the phased array 106. The edge antenna elements 306 may generally be located at the end of the transmission line that couples the driver, to be discussed below, to the antenna elements 114. The dummy antenna elements 306 may be termination load resistors that reduce reflections of the RF signal at the end of the transmission line by providing termination impedance that is matched to the characteristic impedance of the transmission line. This may increase the stability of the frequency and bandwidth properties of the phased array as it scans the beam through different angles.

Figure 4:
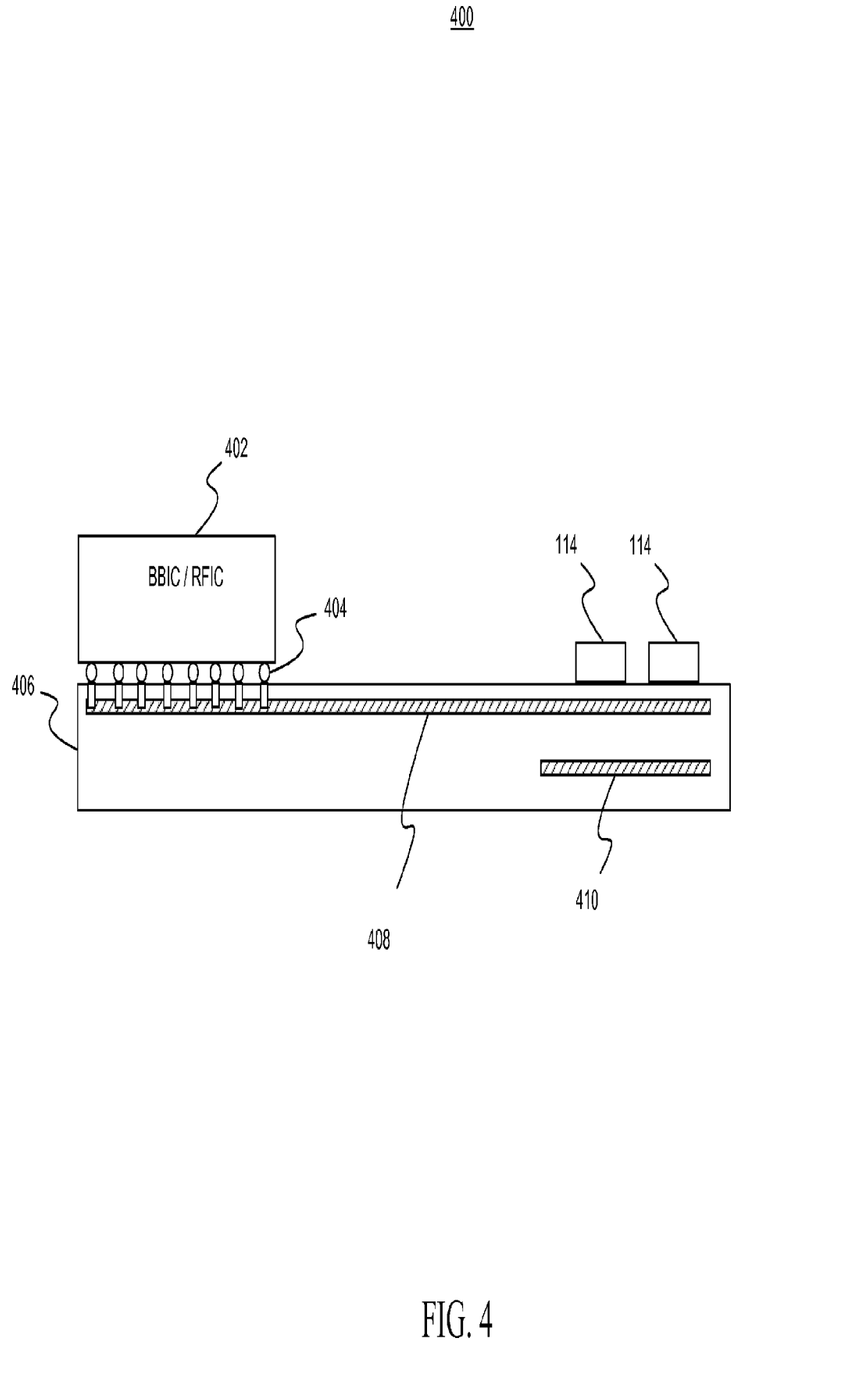
FIG. 4 illustrates a cross sectional view of one exemplary embodiment consistent with the present disclosure.

FIG. 4 illustrates a cross sectional view 400 of one exemplary embodiment consistent with the present disclosure. Shown, are BBIC/RFIC module 402, antenna elements 114, circuit board 406, signal routing layer 408 and ground plane 410. BBIC/RFIC module 402 may be electrically coupled to signal routing layer 408 through flip-chip connection points 404. Flip-chip connections, which are also known as "controlled collapse chip connections," are a method of connecting ICs to external circuitry with solder bumps that are deposited on chip pads located on the top side of the chip. During the connection process, the chip is flipped onto the external circuitry such that the top side of the chip faces down and the solder pads on the chip align with the solder pads on the external circuitry. Solder may then be flowed to complete the connection.

Signal routing layer 408 includes electrical traces or transmission lines (not shown) coupling BBIC/RFIC module 402 to each of the antenna elements 114 disposed on the circuit board 406.

In some embodiments, the circuit board 406 may employ standard printed circuit board (PCB) laminate technologies (e.g., the National Electrical Manufacturing Association (NEMA) FR-4 standard), including low loss polytetrafluoroethylene (PTFE) materials, for reduced manufacturing cost. In some embodiments, for example where the platform is a mobile device, circuit board 406 may be a plug-in card.

In a preferred embodiment, a single BBIC/RFIC module 402 may drive multiple phased array antennas 106. The use of a single BBIC/RFIC module 402 may permit reduction in cost, power consumption and space consumption. The RFIC may be implemented in silicon complementary metal-oxide semiconductor (Si CMOS) technology or other suitable technologies. The thickness of the circuit board and BBIC/RFIC module 402 combined, may be less than 2 millimeters and may consume an area of less than 1 centimeter by 2 centimeters.

Figure 5:
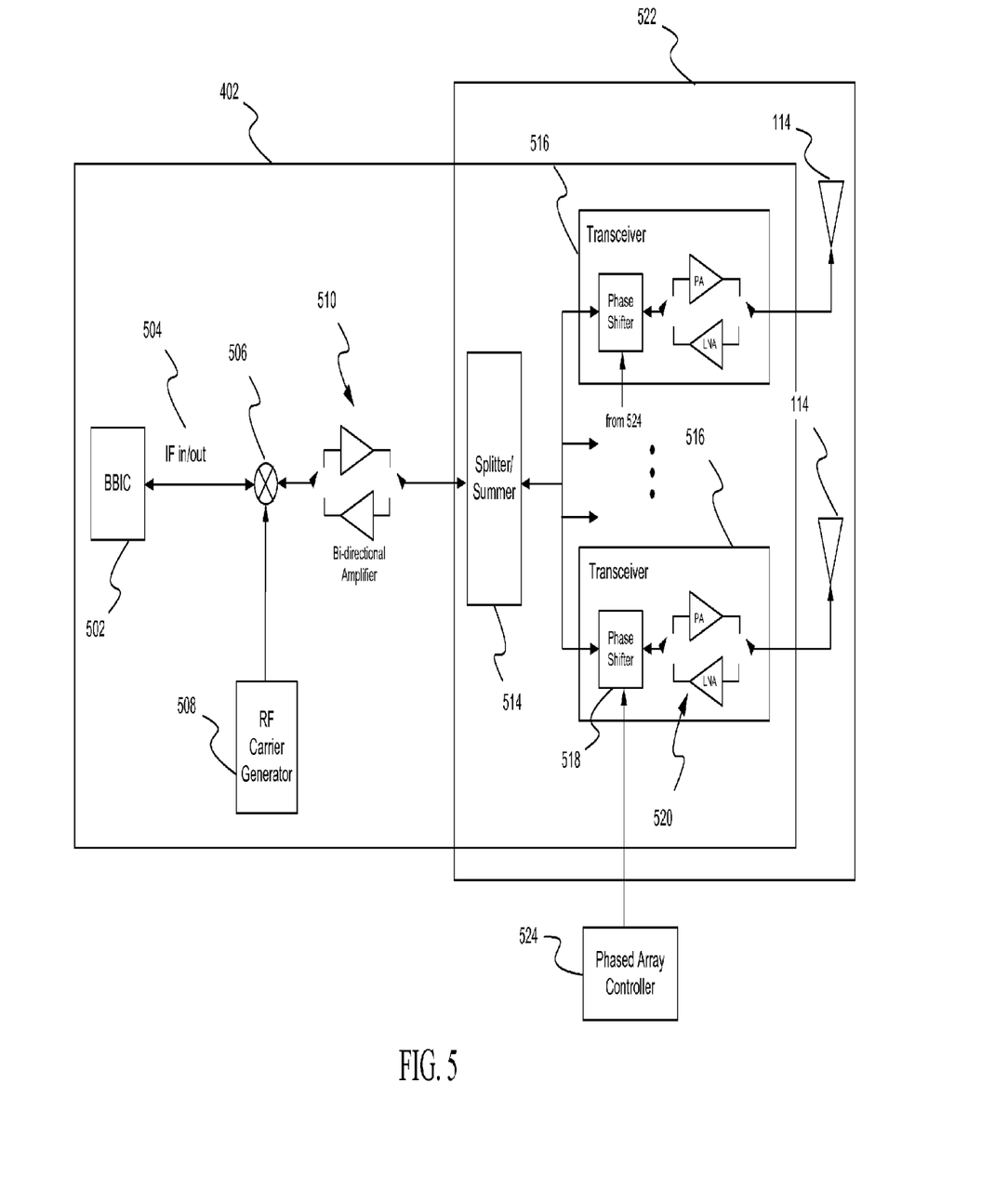
FIG. 5 illustrates a system block diagram of one exemplary embodiment consistent with the present disclosure.

FIG. 5 illustrates a system block diagram 500 of one exemplary embodiment consistent with the present disclosure. Shown are BBIC/RFIC module 402 and antenna elements 114, which may be configured as phased array antenna elements. The BBIC/RFIC module 402 may be a bidirectional circuit, configured to both transmit and receive. In the transmit direction, an IF signal 504 may be provided from BBIC 502. An RF carrier is generated by RF carrier generator 508 and mixed with IF signal 504 by mixer 506 to up-convert the IF signal 504 to an RF signal. Mixer 506 may be a passive bi-directional mixer. The RF signal may be amplified by bi-directional amplifier 510 and then coupled to one or more phased array antenna systems 522 (only one shown). The phased array antenna system 522 transmits the RF signal in a scanned beam pattern, the direction of which is adjustable. To accomplish this, the RF signal is split by splitter/summer 514 and fed to a plurality of transceivers 516. Each transceiver 516 is configured with a phase shifter 518 capable of independently adjusting the phase of the split RF signal being fed to that transceiver 516. The phase shifted RF signal is further amplified by power amplifier (PA) 520 and fed to the antenna element 314 associated with the transceiver 516.

The phase shifter 518 may be under the control of phased array controller 524, which controls the amount and timing of the phase shift adjustments for each transceiver 516. By independently adjusting the phase of each of the split RF signals transmitted through each antenna element 114, a pattern of constructive and destructive interference may be generated between the antenna elements 114 that results in a beam pattern of a desired shape that can be steered to a particular direction. By varying the phase adjustments in real-time, the resultant transmit beam pattern can be scanned through a desired range of directions. In some embodiments the phased array controller 524 may be a general purpose processor, a digital signal processor (DSP), programmable logic or firmware.

A similar process may operate in the receive direction. Each antenna element 114 receives an RF signal which is processed by associated transceiver 516, where it is amplified by low noise amplifier (LNA) 520 and phase shifted by phase shifter 518 under control of phased array controller 524. The outputs of each transceiver 516 are summed by splitter/summer 514. Received RF signals arriving from different directions generally reach each of antenna elements 114 at different times. Phase shifting, which is equivalent to time shifting, may be employed to time align the received RF signals arriving from a particular direction while leaving received RF signals arriving from other directions unaligned. The summation of these RF signals by splitter/summer 514 results in a gain for the time aligned components associated with signals arriving from that particular direction. This results in a beam pattern gain in that direction. By varying the phase adjustments in real-time, the resultant receive beam pattern can be scanned through a desired range of directions.

The received RF signal from phased array antenna system 522 may be further amplified by bi-directional amplifier 510 and then mixed by mixer 506 with the RF carrier generated by RF carrier generator 508 to down-convert the RF signal to an output IF signal 504 which is sent to BBIC 502 for baseband processing.

In some embodiments, the system is configured to operate on RF signals in the frequency range from 57-60 GHz and IF signals in the frequency range from 11.4-13.2 GHz. Baseband signals may be in the approximate range of 2 GHz.

Figure 6:
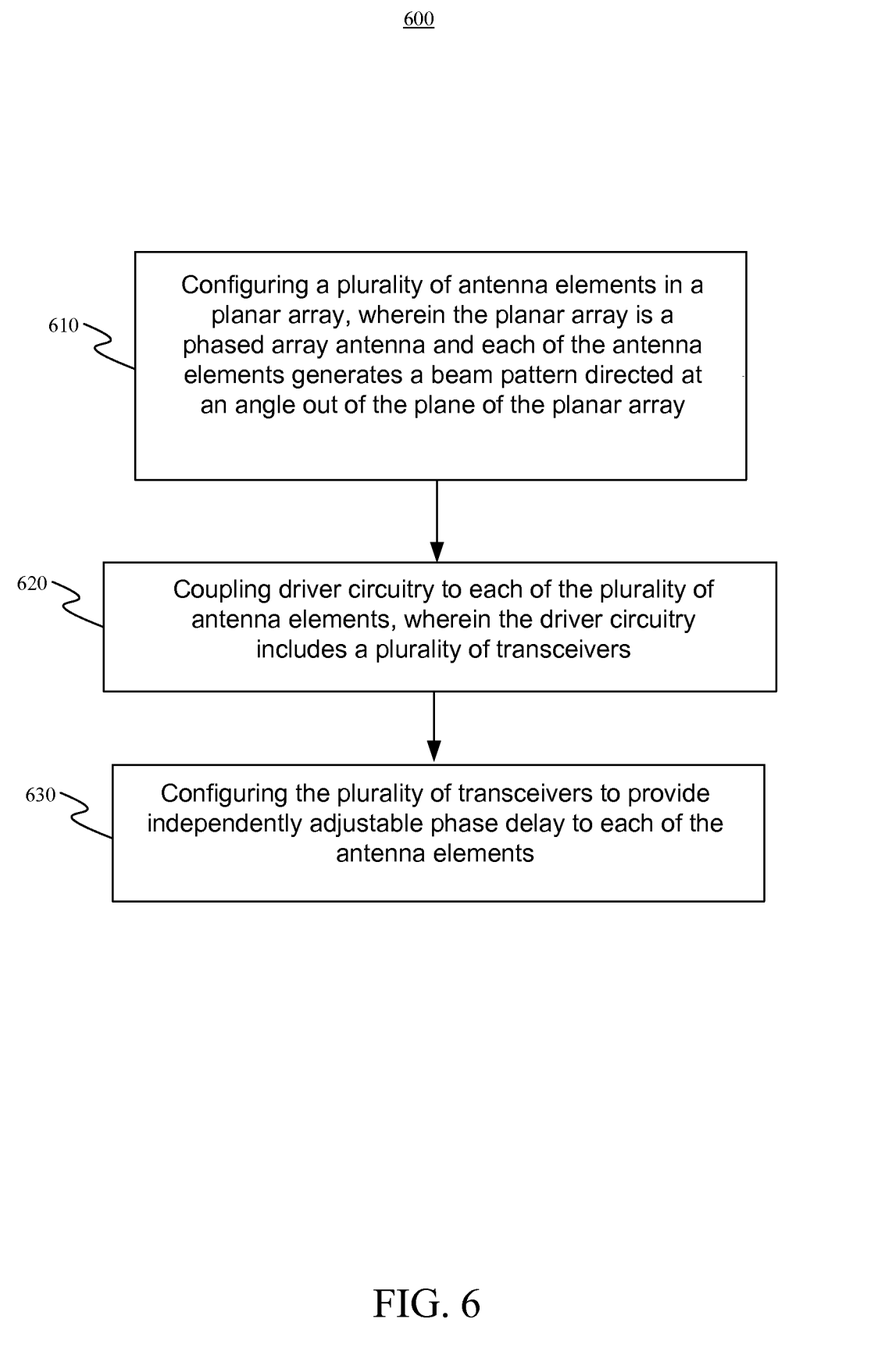
FIG. 6 illustrates a flowchart of operations of one exemplary embodiment consistent with the present disclosure.

FIG. 6 illustrates a flowchart of operations 600 of one exemplary embodiment consistent with the present disclosure. At operation 610, a plurality of antenna elements are configured in a planar array such that the planar array is a phased array antenna, and each of the antenna elements generates a beam pattern directed at an angle out of the plane of the planar array. The angle may be approximately 45 degrees. The phased array antenna may be configured to operate in a millimeter wave frequency range. At operation 620, driver circuitry is coupled to each of the plurality of antenna elements, wherein the driver circuitry includes a plurality of transceivers. At operation 630, the transceivers are configured to provide independently adjustable phase delay to each of the antenna elements. The antenna elements may be configured as rectangular slot loop antennas including a ground plane.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hard-wired circuitry, programmable circuitry, state machine circuitry, and/or firmware that stores instructions executed by programmable circuitry.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system, comprising:
a phased array antenna comprising a plurality of antenna elements, said plurality of antenna elements configured in a planar array, wherein each of said plurality of antenna elements generates a beam pattern directed at an angle out of the plane of said planar array; and
driver circuitry coupled to each of said plurality of antenna elements, wherein said driver circuitry comprises a plurality of transceivers, said plurality of transceivers configured to provide independently adjustable phase delay to each of said plurality of antenna elements;
wherein:
said system is configured to operate in a millimeter wave frequency range;
each of said plurality of antenna elements is a rectangular slot loop antenna that includes a ground plane and comprises a front edge element, a rear edge element and a signal delay element coupled between said front edge element and said rear edge element; and
said signal delay element is configured to cause a respective one of said plurality of antenna elements to generate said beam pattern directed angle.

2. The system of claim 1, wherein said beam pattern directed angle of each of said plurality of antenna elements is approximately 45 degrees.

3. The system of claim 1, wherein said ground plane is parallel to said plane of said planar array.

4. The system of claim 1, wherein said plurality of transceivers implement phased array beam scanning by controlling said adjustable phase delay to each of said plurality of antennas.

5. The system of claim 1 wherein said beam pattern directed at an angle out of the plane of said planar array extends a directionality of Radio Frequency (RF) spatial coverage.

6. A method, comprising:
configuring a plurality of antenna elements in a planar array, wherein said planar array is a phased array antenna and each of said plurality of antenna elements is a rectangular slot loop antenna that includes a ground plane and comprises a front edge element, a rear edge element and a signal delay element coupled between said front edge element and said rear edge element, said signal delay element configured to cause a respective one of said plurality of antenna elements to generate a beam pattern directed at an angle out of the plane of said planar array;
coupling driver circuitry to each of said plurality of antenna elements, wherein said driver circuitry comprises a plurality of transceivers; and
configuring said plurality of transceivers to provide independently adjustable phase delay to each of said plurality of antenna elements, wherein said system is configured to operate in a millimeter wave frequency range.

7. The method of claim 6, wherein said beam pattern directed angle of each of said plurality of antenna elements is approximately 45 degrees.

8. The method of claim 6, wherein said ground plane is parallel to said plane of said planar array.

9. The method of claim 6, further comprising implementing phased array beam scanning by controlling said adjustable phase delay to each of said plurality of antennas.

10. The method of claim 6 wherein said beam pattern directed at an angle out of the plane of said planar array extends a directionality of Radio Frequency (RF) spatial coverage.

11. An apparatus, comprising:
a phased array antenna comprising a plurality of antenna elements, said plurality of antenna elements configured in a planar array, wherein each of said plurality of antenna elements is a rectangular slot loop antenna that includes a ground plane and comprises a front edge element, a rear edge element and a signal delay element coupled between said front edge element and said rear edge element, said signal delay element configured to cause a respective one of said plurality of antenna elements to generate a beam pattern directed at an angle out of the plane of said planar array; and
driver circuitry coupled to each of said plurality of antenna elements, wherein said driver circuitry comprises a plurality of transceivers, said plurality of transceivers configured to provide independently adjustable phase delay to each of said plurality of antenna elements, wherein said system is configured to operate in a millimeter wave frequency range.

12. The apparatus of claim 11, wherein said beam pattern directed angle of each of said plurality of antenna elements is approximately 45 degrees.

13. The apparatus of claim 11, wherein said ground plane is parallel to said plane of said planar array.

14. The apparatus of claim 11, wherein said plurality of transceivers implement phased array beam scanning by controlling said adjustable phase delay to each of said plurality of antennas.

15. The apparatus of claim 11 wherein said beam pattern directed at an angle out of the plane of said planar array extends a directionality of Radio Frequency (RF) spatial coverage.

* * * * *